2,956,921

NEMATOCIDAL POLYAMINE SALTS OF PHOSPHOROTHIOIC ACIDS

Philip H. Santmyer, Florissant, Mo., and Joseph W. Baker, Nitro, W. Va., assignors to Monsanto Chemical Company, St. Louis, Mo., a corporation of Delaware No Drawing. Filed Nov. 15, 1956, Ser. No. 622,269

8 Claims. (Cl. 167—30)

This invention relates to compositions useful in the treatment of soil, particularly to compositions useful in destroying parasitic worms present in the soil, and to a method of applying the same. It further relates to the destruction of the parasitic worms known as nematodes in any of the egg, larvae and adult stages of their life cycles and particularly those harmful worms which attack crop plants and cause considerable damage thereto.

The problem of controlling harmful and unwanted parasites present in the soil, such as nematodes, is one of considerable complexity. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and possess a sufficiently low vapor pressure so that it does not evaporate before its destructive action is accomplished. Moreover, if the toxicant is to be employed in an area where valuable plants are growing, low phytotoxicity is also required.

Since the exacting requirements of any practical agent cannot be recognized by methods other than by test, it is necessary to observe the effectiveness of chosen compounds against the life cycle of the parasite. From such observations it has now been discovered that substituted ammonium salts from polyamines, preferably containing a hydrophobic substituent, and thiophosphorus acids of the class, O,O-bis(halophenyl) S-hydrogen phosphorodithioates, are highly effective for controlling soil infecting organisms, particularly nematodes, and usually are harmless to plant life. The thio acids from which the new toxicants are derived may be represented by the structural formula

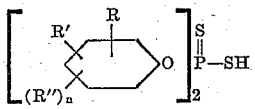

where R represents a halogen substituent preferably chlorine or bromine, R' is preferably another halogen but may be hydrogen, lower alkyl or phenyl, R" is preferably hydrogen but may be halogen and $n$ is an integer less than four.

PREPARATION OF THIO ACIDS

The O,O-bis(halophenyl) S-hydrogen phosphorodithioates required for the preparation of the new toxicants may be prepared by heating four molecular proportions of the halophenol and one molecular proportion of $P_2S_5$. The reactions are usually essentially quantitative and the composite reaction products are suitable for use without further purification. Examples comprise O,O-bis(2,4-dichlorophenyl) S-hydrogen phosphorodithioate, O,O,-bis(2,4,5-trichlorophenyl) S-hydrogen phosphorodithioate, O,O - bis(p - chlorophenyl) S - hydrogen phosphorodithioate, O,O-bis(2,4,6-trichlorophenyl) S-hydrogen phosphorodithioate, O,O - bis(o - chlorophenyl) S-hydrogen phosphorodithioate, O,O-bis(2,4-dibromophenyl) S-hydrogen phosphorodithioate, O,O-bis(p-bromophenyl) S-hydrogen phosphorodithioate, O,O-bis-(m-chlorophenyl) S-hydrogen phosphorodithioate, O,O-bis(2-chloro-4-phenylphenyl) S-hydrogen phosphorodithioate and O,O-bis(4-chloro-3-methylphenyl) S-hydrogen phosphorodithioate.

These and other suitable acids can be prepared by adding $P_2S_5$ to the molten phenol and heating the mixture at 140–150° C. for 1 to 3 hours. The reaction with p-bromophenol is quite rapid at 125° C. Thirty minutes heating at 120–130° C. is sufficient.

The salt forming constituent is an alkylene polyamine, as for example ethylene diamine, diethylene triamine, triethylene tetramine and tetraethylene pentamine but preferably contains a hydrophobic constituent of at least 6 carbon atoms. The polyamine radicals comprise cyclic as well as open chain radicals. For example, the products obtained by reacting a higher monocarboxylic acid with a polyalkylenepolyamine having one more nitrogen atom per molecule than there are alkylene groups are especially desirable. These products comprise cyclic structures containing a dihydroimidazole (imidazoline) or tetrahydropyrimidine ring. They are described in U.S. Patent No. 2,568,876 to White et al. The intermediates described in this patent, which are produced by reacting a monocarboxylic acid with a polyalkylene polyamine, comprise a class of salt forming constituents useful in the practice of the present invention.

Suitable acids for reacting with polyamines are the carboxylic acids which have from 8 to 22 carbon atoms and may be either saturated or unsaturated include the following: linoleic, linolenic, amylpropiolic, stearolic, palmitolic, hypogeic, elaidic, behenic, erucic, arachidic, stearic, margaric, palmitic, myristic, lauric, capric, brassidic and mixtures of the above acids as are obtained by the saponification of animal and vegetable oils, such as cottonseed oil, linseed oil, stearin, palm oil, whale oil, fish oils, corn oil, tung oil, olive oil, sunflower oil and other naturally occurring animal and vegetable oils of the glycerol ester type. Fatty acid mixtures separated from tall oil are also useful.

In reacting the polyamines with the acids a mixture of substituted products will be found. If equal molar quantities of reactants are used, obviously there will be unreacted polyamines, so most efficient practice involves the use of a slight excess of the acid, for example, from 1 to 2 moles of the acid for each mole of polyamine to utilize all of the polyamine. It is not necessary or desirable to separate the various reaction products. Thus the reaction product will differ slightly in its chemical and biological properties from the pure imidazoline.

Still other amines are 1-methyl 2-n-undecyl-4,5-dihydroimidazole, 1-methyl-2-n-decyl-4,5-dihydroimidazole, 1-n-dodecyl-2-methyl-4,5-dihydroimidazole, 1-n-decyl-2-methyl-4,5-dihydroimidazole, and other dihydroimidazoles containing a long chain hydrophobic group described in U.S. Patents 2,392,326 and 2,418,077 to Kyrides.

Another valuable class of the amine salt-forming constituent comprise higher alkenyl polyamines of the structure

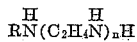

where $n$ is an integer of 1 to 5 and R is a higher alkenyl radical containing at least 6 carbon atoms and one double bond. Examples of these amines include N-tetrapropenyl ethylenediamine, N-tetrapropenyl diethylenetriamine, N-tetrapropenyl triethylenetetramine and N-tetrapropenyl tetraethylene pentamine. The preparation of this class of amines is described in copending application of Thomas E. Lesslie et al., Serial No. 438,341, filed June 21, 1954.

Similarly useful are higher alkyl alkylene polyamines, as for example N-2-ethylhexyl ethylenediamine, N-dodecyl ethylenediamine, N-octadecyl ethylenediamine, N-2-ethylhexyl hexamethylenediamine, N-octyl ethylenediamine, N-octyl diethylenetriamine, N-n-hexadecyltriethylene tetramine, N-n-decyl ethylenediamine, N-n-tetradecyl ethylenediamine, N-n-dodecyl diethylenetriamine and N-n-tetradecyl diethylenetriamine.

A very economical amine can be prepared from a mixture of alkyl chlorides resulting from chlorination of a kerosene fraction boiling within the range of 188°–232° C. For example, 300 parts by weight of the aforesaid hydrocarbon fraction was chlorinated with 64 parts by weight of chlorine at 80–85° C. The specific gravity of the chlorinated mixture was 0.843 at 25° C. The chlorinated product was agitated with 51.5 parts by weight of 50% NaOH, then separated from the wash layer and filtered through a clay bed. The filtrate was mixed with 195 parts by weight of diethylene triamine and heated at 165–172° C. for 22 hours. The charge was then cooled to 120° C., the amine hydrochloride layer drawn off and the residue washed with 60.5 parts by weight of 50% NaOH for half an hour. After the layers separated, the caustic layer was drawn off and the product layer stripped of unreacted amine and kerosene by heating at 26 mm. Hg. If desired the product may be further purified by distillation, collecting the fraction boiling over the range of 118°–183° C./2 mm. but this is not necessary for the purposes of this invention.

*Example 1*

Into a reaction vessel equipped with a thermometer, stirrer, Dean-Stark trap and condenser there were added 256 parts (1.75 moles) of triethylene tetramine and 658 parts (2.33 moles) of oleic acid. Some heat was evolved and the temperature rose to 75° C. Then 91.4 parts of benzene were added and the resulting solution heated to 137° C. over a 20 minute period at which point reflux began. A sufficient quantity of benzene was added or water withdrawn to maintain refluxing at 141–148° C. and refluxing continued for 10½ hours. At the end of this period, 123 parts of benzene had been added and 76 parts of water collected. Vacuum distillation at 145° C. under 105 mm. pressure gave a product with a neutralization number of 4.52.

To 25 parts (1.0 mole) of the above reaction product in 19 parts of xylene were added with stirring and cooling 50 parts (2.3 moles) of O,O-bis(2,4-dichlorophenyl) S-hydrogen phosphorodithioate. This addition required 15 minutes during which time the temperature was maintained under 45° C. Agitation was continued for an additional 10 minutes. The product, comprising the salt prepared from the reaction product of oleic acid and triethylene tetramine by combining this polyamine in a ratio of 1 mole to 2.3 moles of O,O-bis(2,4-dichlorophenyl) S-hydrogen phosphorodithioate, was obtained as a very viscous orange-brown liquid.

*Example 2*

Phytotoxicity is reduced by using a higher ratio of amine. The product of this example was the oleic acid-triethylene tetramine salt of O,O-bis(2,4-dichlorophenyl) S-hydrogen phosphorodithioate in a ratio of 1:1. The thio acid was added to the cooled mixture of the intermediate of Example 1 over a period of 15 minutes at 30–45° C. Stirring was continued for an additional 15 minutes at 45° C. and a light brown viscous product was obtained.

*Example 3*

An alkenyl chloride was produced by reacting 76.2 parts by weight of sodium hypochlorite solution (of 11.7% by weight hypochlorite content) and 19.2 parts by weight of propylene tetramer in a vessel equipped with agitation, external cooling and temperature recording means. The vessel and contents were then cooled to below 10° C. and maintained at that temperature while slowly adding 12.25 parts of 36% hydrochloric acid. After the acid is all added, the mixture is agitated for approximately one-half hour and then is allowed to settle, following which the bottom layer is drawn off and discarded and the oily top layer is washed twice with water. The tetra propenyl chloride so obtained is then reacted with an amine by the following typical procedure:

To a reaction vessel equipped with an agitator, a reflux condenser and temperature recording means, there were added 51.7 parts of diethylene triamine and 30.7 parts of tetra propenyl chloride. The mixture was agitated and slowly heated to a temperature of reflux (about 197° C.) and maintained thereat for approximately 5 hours. Thereupon while continuing the agitation, the mixture was allowed to cool to a temperature of substantially 140° C. and then allowed to settle. The bottom layer consisting of amine salt, namely diethylene triamine hydrochloride, was then drawn off from the reactor, and the balance of the reaction product subjected to distillation at substantially 165° C. under a 45 mm. vacuum to remove the unreacted tetra propenyl chloride and diethylene triamine. The residue comprising the desired product, tetra-propenyl-diethylenetriamine, may, if desired, be clarified by filtration through clay by suitable means.

To 57.5 parts (0.2 mole) of the tetrapropenyl diethylene triamine so prepared was added with stirring 44.0 parts (0.2 mole) of O,O-bis(2,4-dichlorophenyl) S-hydrogen phosphorodithioate. The temperature was maintained at 45–55° C. during the addition which required 15 minutes. The mixture was then heated an additional 20 minutes at 55–65° C. The product of Example 3 designated as the tetrapropenyl diethylene triamine salt of O,O-bis(2,4-dichlorophenyl) S-hydrogen phosphorodithioate, was a brown viscous material.

*Example 4*

The triethylene tetramine salt of O,O-bis(2,4-dichlorophenyl) S-hydrogen phosphorodithioate was prepared by mixing equimolar proportions of the polyamine and acid in chloroform solution at 30–40° C. Cooling was required. After stirring one hour the solvent was removed in vacuo. The product was a viscous amber liquid.

As specific embodiments of the invention nematocidal activity may be demonstrated by preparing a suspension of the nematode *Panagrellus redivivus* in water and observing through a microscope the motility of the organism in the presence of 0.1% of one of the aforedescribed salts. The nematode in aqueous suspension will flex its body at a regular rate and as the nematocide takes effect, the rate of flexing is decreased until death of the parasite occurs. The control containing no added toxicant will show undiminished activity after 24 hours whereas complete destruction of the nematode takes place in the presence of the salt prepared from O,O-bis(2,4-dichlorophenyl) S-hydrogen phosphorodithioate and the reaction product of oleic acid and triethylene tetramine in a molar ratio of 1:2.3 (product of Example 1). Moreover, the reduction in motility was 50% in 24 hours in the presence of 0.01% of this composition and the phytotoxicity was less than that of ammonium O,O-bis(2,4-dichlorophenyl) phosphorodithioate.

After observing that the herein described salts were toxic to *Panagrellus redivivus*, they were tested more extensively and found to control root knot. This property was demonstrated as follows: Sterilized soil was infested with nematodes (Meloidogyne sp.) and different portions treated with solutions containing the test materials. After standing for a week, two-week old tomato plants were transplanted in the test soil and also in untreated, heat-sterilized soil. The plants were allowed to grow for two months, then were harvested, the roots washed and examined for evidence of infection. Comparison to the untreated controls gave the phytotoxicity of the compounds. For convenience in recording the index of infection and phytotoxicity in the table below, the following rating keys were used:

| Infestation | Phytotoxicity |
|---|---|
| 1. No infection. | 0. No evidence of phytotoxicity. |
| 2. Infection, barely recognized. | 1. Slight toxicity. |
| 3. Light infection. | 2. Moderate toxicity. |
| 4. Medium infection. | 3. Severely toxic. |
| 5. Heavy infection. | 4. No plant survival. |

TABLE I

| Toxicant Product of Example | Conc. | Infestation | Phytotoxicity |
|---|---|---|---|
| 2 | 0.01 | 2 | 2 |
| 3 | 0.01 | 2 | 1 |
| 3 | 0.1 | 1 | 1 |
| 4 | 0.01 | 1 | 1 |

In actual usage any of the compounds within the preferred class described may be added to the soil in solution, as an emulsion or water dispersion but preferably is added in a solid formulation wherein the active nematocide is distributed over some dry and permanently free-flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of nematode parasites which infest animals. Treating barnyards, chicken pens, stables and other infested areas destroys eggs and infective larvae of many parasites which infest animals. Moreover, the compositions are effective for the control of nematodes in their environment which includes bodies of animals. They are toxic to other worms such as flukes and tapeworms. The new compounds are toxic to ascarid eggs. Thus, it has been possible to reduce the infestations of chickens with *Ascaridae galli* to 50% of the control by spraying the infected chicken yard with the product of Example 2 at the rate of 100–200 grams per 100 sq. ft. Since this composition is non-phytotoxic, it is valuable for the control of parasites in pasture lands.

In the use of substituted ammonium salts from polyamines containing a hydrophobic substituent and thiophosphorus acids of the class O,O-bis(halophenyl) S-hydrogen phosphorodithioates, as nematocides or soil fumigants the active compound, diluted or undiluted, may be applied to the soil at rates of 10 to 500 pounds per acre. The preferred application for treating soils of average nematode infestation will be from 25 to 100 pounds per acre. The formulation may contain dispersants which aid uniform distribution.

It is intended to cover all changes and modifications of the examples of the invention herein chosen for purposes of disclosure which do not constitute departures from the spirit and scope of the invention.

What is claimed is:

1. The method of destroying nematodes in nematode infested agricultural soils which comprises contacting the said organisms with an addition salt of an acid possessing the structure

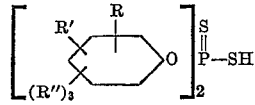

R, R' and (R")₃ representing the 5 substituents on the carbon atoms of the phenyl radical, where R is selected from the group consisting of chlorine and bromine, R' is selected from the group consisting of chlorine, bromine, hydrogen, lower alkyl and phenyl, R" is selected from the group consisting of chlorine, bromine, hydrogen and combinations thereof and wherein the salt forming constituent is a polyamine selected from the group consisting of unsubstituted alkylenepolyamines of the structure

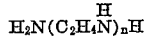

where $n$ represents an integer of 1–4 inclusive and polyamines substituted by an acyclic radical selected from the alkyl and monoolefinic series, said substituted polyamine being selected from the group consisting of acyclic imidazolines containing an acyclic substituent of 8–22 carbon atoms on one of the positions 1- and 2-, acyclic tetrahydropyrimidines containing an acyclic substituent of 8–22 carbon atoms on the carbon atom joining the nitrogen atoms and alkylenepolyamines of the structure

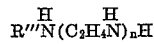

where R''' represents an acyclic radical containing 6–22 carbon atoms and $n$ has the same meaning as before.

2. The process of claim 1 wherein the salt forming constituent is an alkyl imidazoline containing an alkyl substituent of 8–22 carbon atoms on the carbon atom joining the nitrogen atoms.

3. The process of claim 1 wherein the salt forming constituent is

where R represents a monoolefinic hydrocarbon radical of 6–22 carbon atoms and $n$ represents an integer of 1–4 inclusive.

4. The method of destroying nematodes in nematode infested agricultural soils which comprises contacting the said organisms with a salt of O,O-bis(2,4-dichlorophenyl) S-hydrogen phosphorodithioate wherein the salt forming constituent is an imidazoline of triethylene tetramine containing the C₁₇H₃₃ group on the carbon atom which joins the two nitrogen atoms of the imidazoline ring.

5. The process of claim 4 wherein the salt forming constituent is

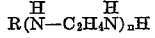

where R represents an alkyl group of 6–22 carbon atoms and $n$ represents an integer of 1–4 inclusive.

6. The process of claim 4 wherein the salt forming constituent is

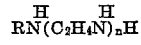

where R represents a monoolefinic hydrocarbon radical of 6–22 carbon atoms and $n$ represents an integer of 1–4 inclusive.

7. A nematocidal composition comprising more than 50% of an inert nematocidal adjuvant as a carrier and an effective nematocidal concentration of an addition salt of an acid possessing the structure

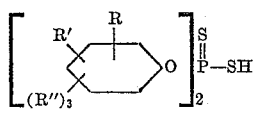

R, R' and (R")₃ representing the 5 substituents on the carbon atoms of the phenyl radical, where R is selected from the group consisting of chlorine and bromine, R' is selected from the group consisting of chlorine, bromine, hydrogen, lower alkyl and phenyl, R" is selected from the group consisting of chlorine, bromine, hydrogen and combinations thereof and wherein the salt forming constituent is a polyamine selected from the group consisting of unsubstituted alkylenepolyamines of the structure

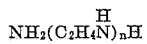

where $n$ represents an integer of 1–4 inclusive and polyamines substituted by an acyclic radical selected from the alkyl and monoolefinic series, said substituted polyamine being selected from the group consisting of acyclic imidazolines containing an acyclic substituent of 8–22 carbon atoms on one of the positions 1- and 2-, acyclic tetrahydropyrimidines containing an acyclic substituent of 8–22 carbon atoms on the carbon atom joining the nitrogen atoms and alkylenepolyamines of the structure

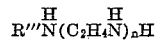

where $n$ has the same meaning as before and R'" represents an acyclic radical containing 6–22 carbon atoms.

8. A nematocidal composition comprising more than 50% of an inert nematocidal adjuvant as a carrier and an effective nematocidal concentration of a salt of O,O-bis(2,4-dichlorophenyl) S-hydrogen phosphorodithioate wherein the salt forming constituent is an imidazoline of triethylene tetramine containing the $C_{17}H_{33}$ group in the carbon atom which joins the two nitrogen atoms of the imidazoline ring.

References Cited in the file of this patent

UNITED STATES PATENTS

| | | |
|---|---|---|
| 1,939,951 | Buchanan | Dec. 19, 1933 |
| 2,419,073 | Hammer | Apr. 15, 1947 |
| 2,689,258 | McDermott | Sept. 14, 1954 |
| 2,694,084 | Brugmann | Nov. 9, 1954 |
| 2,730,547 | Dye | Jan. 10, 1956 |
| 2,743,209 | Jones | Apr. 24, 1956 |
| 2,754,242 | Kosolapoff | July 10, 1956 |
| 2,757,117 | Berum | July 31, 1956 |
| 2,761,806 | Boyer | Sept. 4, 1956 |
| 2,769,745 | Hardy | Nov. 6, 1956 |
| 2,770,638 | Crolito | Nov. 13, 1956 |
| 2,779,680 | Wolf | Jan. 29, 1957 |
| 2,802,021 | Heininger | Aug. 6, 1957 |
| 2,802,818 | Wheeler | Aug. 13, 1957 |
| 2,824,890 | Heininger | Feb. 25, 1958 |
| 2,857,308 | Baker | Oct. 21, 1959 |